United States Patent [19]

Romano

[11] Patent Number: 4,872,098

[45] Date of Patent: Oct. 3, 1989

[54] VARIABLE BEAM FLOODLIGHT

[75] Inventor: Perry Romano, Lake Zurich, Ill.

[73] Assignee: LPI Limited Partnership, Gurnee, Ill.

[21] Appl. No.: 326,006

[22] Filed: Mar. 20, 1989

[51] Int. Cl.$^4$ .............................................. F21V 7/00
[52] U.S. Cl. .................................. 362/283; 362/284; 362/297; 362/324; 350/626
[58] Field of Search .............. 362/322, 323, 324, 346, 362/284, 282, 283, 297; 350/615, 626; 313/114

[56] References Cited

U.S. PATENT DOCUMENTS 1,591,754  7/1926  Gates ..................................... 362/283
1,633,509  6/1927  Anderson ............................ 362/284
4,499,529  2/1985  Figueroa ............................. 362/283

Primary Examiner—Carroll B. Dority
Attorney, Agent, or Firm—LaValle D. Ptak

[57] ABSTRACT

A variable beam floodlight fixture is provided for simply and quickly changing the width of the beam by means of a single operating lever which controls ganged, multiple, pivoted reflector sections. Pivoted reflector sections are provided on opposite sides of a fixed central reflector, and the multiple sections on each side simultaneously pivot in different amounts under control of the operating lever to provide a uniform beam at the various angles available from the narrowest beam to the widest beam attainable from the fixture.

20 Claims, 2 Drawing Sheets

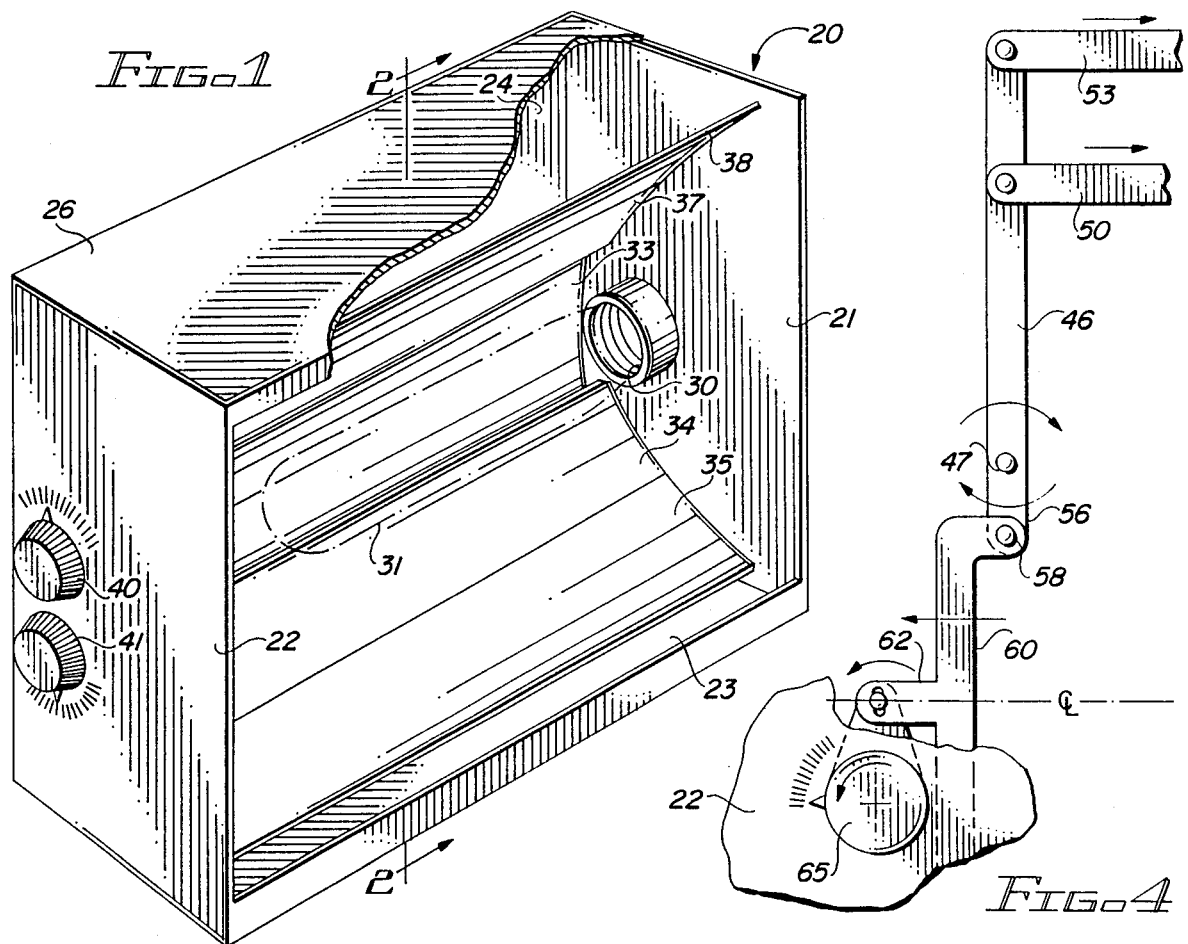
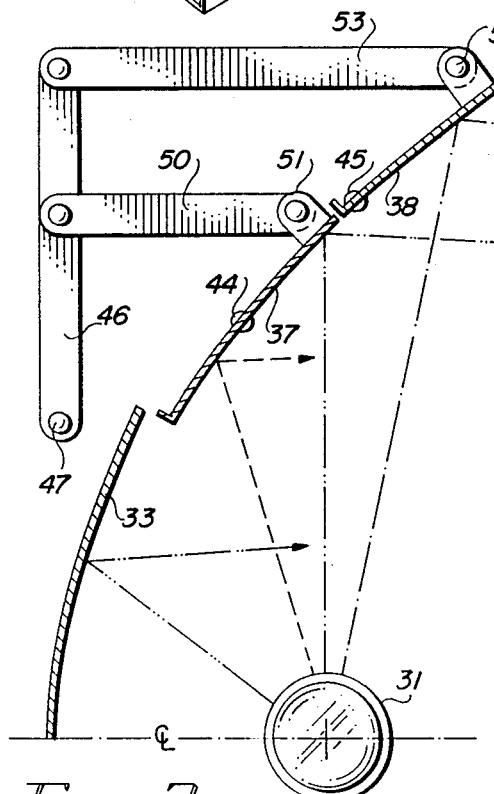
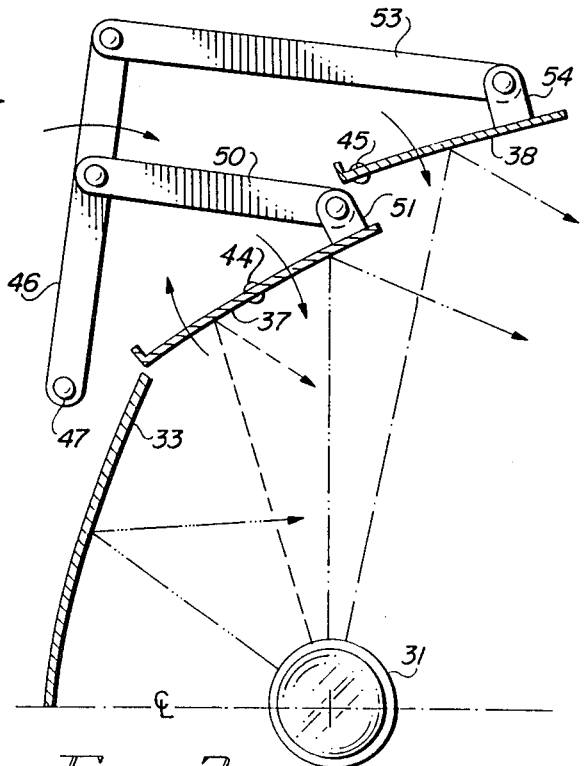

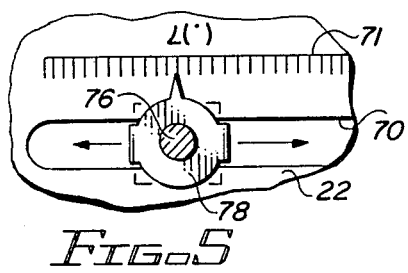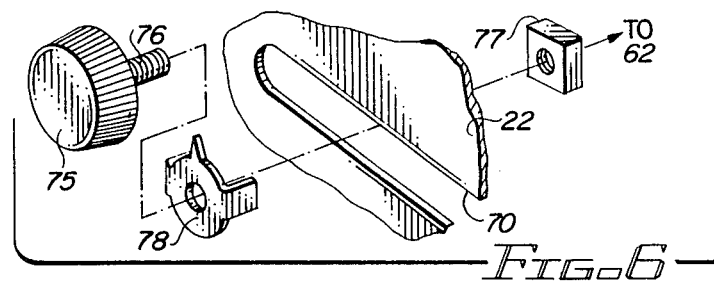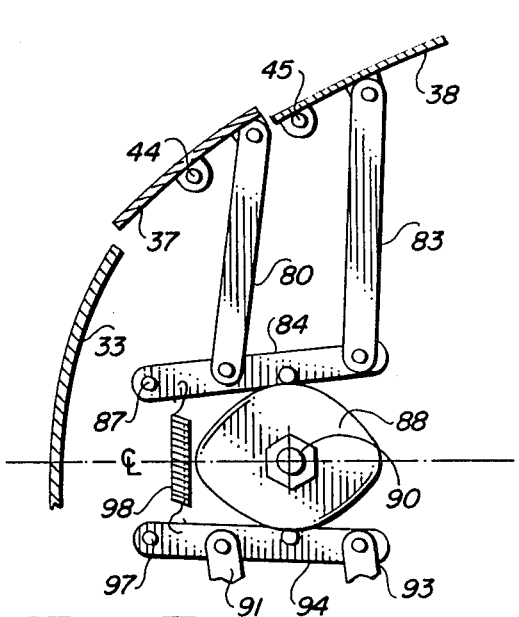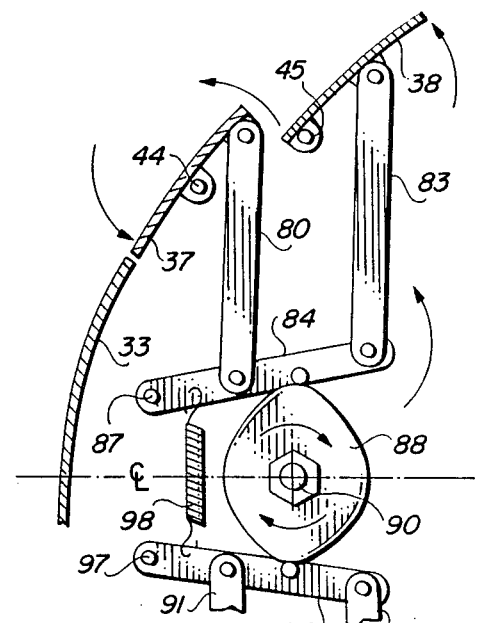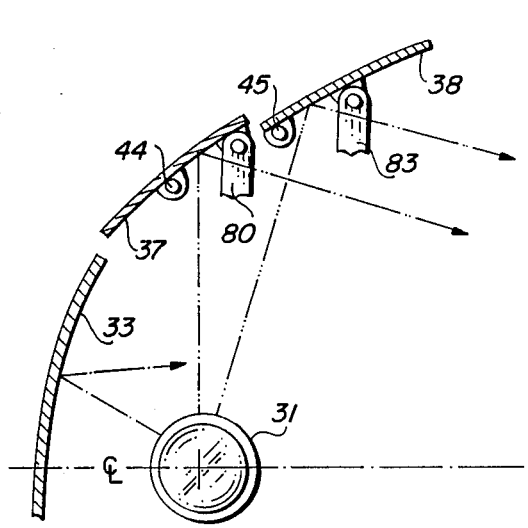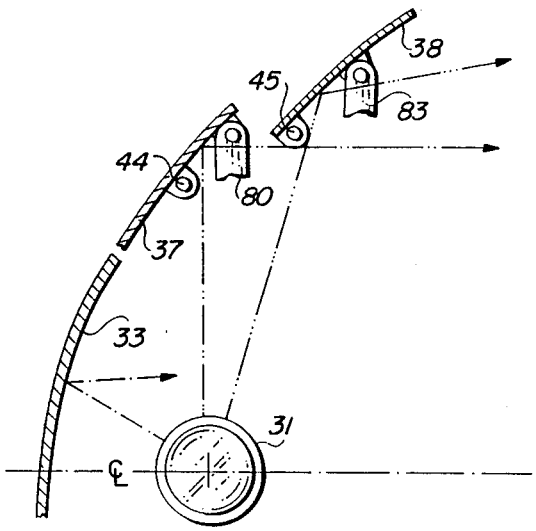

VARIABLE BEAM FLOODLIGHT

BACKGROUND

Floodlight fixtures are used in a variety of industrial and commercial applications. Typcially, such fixtures are made with fixed reflectors, either of a single section or multiple sections arranged to provide the desired spread of light from the lamp used as the light source for each individual application of the floodlight. This results in a fixed design for applications where the orientation of the luminaire in which the reflector system is placed, the hight of the mounting of the fixture, and the space between different fixtures is pre-established. If fixtures are placed more closely together or at heights differing from the optimum designed position, non-uniform illumination of the area below the floodlight results, producing shadows, light and dark stripes of illumination and the like.

If a floodlight fixture is to be designed for a non-standard mounting arrangement, it typically has been necessary to custom design the reflector sections to provide the proper spread of light. This is expensive and time consuming. Even so, if the conditions at installation vary from the design parameters of the reflector, unwanted shadows and bright spots still may occur.

An effort to provide a flexible floodlight fixture is disclosed in the Moore U.S. Pat. No. 3,610,915. This patent discloses a luminaire for housing an adjustable floodlight. A wibdow area is located in the housing intermediate its end walls, and a single reflector unit is mounted behind the lamp. This reflector is pivoted to direct the reflected light from the lamp to a desired area beneath the housing. The width of the refleced beam is not varied, although in the extreme positions, a portion of the reflected light impinges upon the solid walls of the housing. Thus, the beam existing from the housing is narrower when this occurs. This results in a reduced amount of light exiting form the housing, however, since some of the reflected light is simply dumped into the opaque or non-transparent side of the housing.

A different approach is disclosed in the Moore U.S. Pat. No. 3,001,061. This patent is directed to a floodlight reflector which has a provision for changing the width of the reflector beam. In Moore, the reflector is made of a relatively large number of segmented reflector sections, which are bent to provide the desired reflected beam. Segments of different lengths, bent to different curvatures, may be used to change the beam width. It is necessary to insert different segments individually if the beam width is to be changed. As a result, this reflector has the beam width adjusted at the time of manufacturer; and it is not intended to be thereafter adjusted at the place of use.

The McReynolds U.S. Pat. No. 4,028,542 discloses a faceted parabolic reflector system with two side reflector sections, which may be repositioned or positioned at the place of manufacture to selected the beam width of the luminaire in which they are used. The sections are not intended to be pivoted, and different sets of mounting holes are provided in the sides of the housing corresponding to different beam width angles to be produced by the fixture.

The Figueroa U.S. Pat. No. 4,499,529 is directed to a florescent light fixture which is capable of adjustment to vary the effective illumination area beneath the fixture. This patent discloses a reflector system which has a number of individually tiltable reflector sections on each side of an elongated light source to change the width of the illumination area beneath the reflector. The reflector sections are not ganged together, but are individually tiltable about the longitudinal axes parallel to the axis of the bulb used in the fixture. A considerable amount of trial and error adjustment is necessary to provide uniform illumination beneath the fixture.

Other attempts have been made to provide light fixtures which are pivoting reflector to vary the direction of the light beam from the fixture. Two such fixtures used for automobile headlights are shown in the Kay U.S. Pat. No. 1,902,860 and Bostic U.S. Pat. No. 2,064,880. In both of these patents, a reflector section is pivoted about an axis to two or more different positions to change the direction of the beam from the automobile headlight. A single reflector section pivoted through a single actuating lever is used in both cases.

It is desirable to provide a floodlight which is capable of producing a variable beam over a relatively wide angular range, which also is simple to construct and which readily may be adjusted either at the factory or at the point of use.

SUMMARY OF THE INVENTION

Accordingly, it is an object of this invention to provide an improved reflector system.

It is another object of this invention to provide an improved floodlight reflector system.

It is an additional object of this invention to provide an improved variable beam floorlight.

It is a further object to this invention to provide an improved variable beam floodlight with moveable reflector sections.

It is still another object of this invention to provide an improved variable beam floodlight with multiple ganged, segmented, moveable, reflector sections for adjusting the width of the beam of light emitted from the system.

In accordance with a preferred embodiment of this invention, a variable from floodlight reflector includes a housing with a light exit opening in it and first and second opposite ends. A lamp is mounted in the housing behind the light exit opening, and a fixed reflector section is located behind the lamp and extends across the space between the two ends. The width of this fixed section is less than the width of the light exit opening. At least first and second pivoted reflector sections are mounted in the housing on one side of the fixed reflector section between the ends of the housing. An operating device is attached to the pivoted reflector sections, and simultaneously pivots the two sections through different degrees of rotation with respect to one another. This varies the beam of light emitted from the light exit opening in the housing in accordance with the pivoted orientation of the first and second pivoted reflector sections.

BRIEF DESCRIPTION OF THE DRAWINGS

FIG. 1 is a perspective view of a preferred embodiment of the invention;

FIG. 2 is a cross-sectional diagrammatic view of a portion of the mechanism of the embodiment of FIG. 1, illustrated in a first operating position;

FIG. 3 is a cross-sectional diagrammatic view of the same operating mechanism shown in FIG. 2 in a different operating position;

FIG. 4 is a variation of the operating mechanism of FIGS. 2 and 3;

FIGS. 5 and 6 comprise detailed representations of a variation of the embodiment of FIG. 4;

FIG. 7 is a diagrammatic view of another embodiment of the operating mechanism which may be used in conjucntion with the embodiment of FIG. 1;

FIG. 8 is a diagrammatic view of the reflector section positions effected by the operating mechanism in the condition shown in FIG. 7;

FIG. 9 is a diagrammatic view of the mechanism of FIG. 7 in a different condition of operation; and FIG. 10 is a diagrammatic view of the reflector section positions effected by the operating mechanism in the condition shown in FIG. 9.

DETAILED DESCRIPTION

Reference now should be made to the drawings in which the same reference numbers are used throughout the different FIGS. to designate the same or similar components. FIG. 1 is a front perspective view of a variable beam floodlight fixture in accordance with a preferred embodiment of the invention. The fixture 20 comprises an elongated rectangular box for housing the various components of the floodlight. The box includes a pair of parallel opposing ends 21 and 22, sides 23 and 26, and a back 24. The front of the housing is open or it may include a suitable light transparent lens of any of a variety of different types commonly used with such fixtures.

A lamp socket 30 is provided on the end wall 21, and it is connected to a suitable source of electrical power (not shown) in any conventional manner. An elongated bulb 31 is illllustrated in dotted lines for producing light to be emitted from the fixture. This bulb 31 may be of any suitable type, such as sodium vapor, mercury vapor, or both high intensity discharge (HID) lamps. These types of lamps are preferred, but any lamp providing light emitting characteristics suitable for a particular application may be used. Common lamp sources are utilized for the lamp 31.

Floodlights typically include a reflector behind the lamp to reflect outwardly all of the rays from the lamp which otherwise are directed toward the interior of the fixture. Typically, reflector panels are made of highly polished or specular material formed of glass mirrors or metal. Typical commercial reflectors employ panels made of highly polished aluminum or plastic with a polished metal coating on it. The particular material out of which the reflector sections of the embodiment of FIG. 1 is made is not important; and any suitable, currently available material may be used.

The reflector utilized in the variable beam floodlight of FIG. 1 is a multi-section reflector to permit changes in the beam of light emitted from the open side of the fixture 20 to be varied from a pre-established minimum width to a maximum width, including beams of all widths in between the minimum and maximum beam divergence. To accomplish this, a first fixed reflector segment 33 is attached across the ends 21 and 22 directly behind the bulb 31. The center of this reflector segment is aligned with the central axis of the lamp 31, and it extends equally above and below the central lamp axis (as viewed in FIG. 1). The cross-sections of the reflector segment 33 are identical in planes parallel to the planes of the ends 21 and 22 of the housing. These cross-section preferably are curved, parabolic sections, the concave surfaces of which face outwardly toward the open light emitting side of the fixture 20.

As illustrated in FIG. 1, four (4) additional reflector section 34, 35, 37, and 38 are mounted on pivots above and below this fixed section 33 between the end walls 21 and 22; so that the rotational angles of the sections 34, 35, 37, and 38 may be varied to change the direction of reflected light emitting from them as such reflected light exits through the open side of the fixture 21. This is accomplished by mounting each of these sections pivotally on axes parallel to the central axis of the lamp 31 between the ends 21 and 22 in the arrangement shown in FIG. 1.

On at least one end, a mechanism is provided to interconnect with the sections 34, 35, 37, and 38, to permit adjustmemt of the amount of tilt provided. The mechanism then is attached to a convenient knob 40, for tilting the sections 37 and 38, or a knob 41, for tilting the sections 34, and 35. These knobs are located on the outside of the end 22, as illustrated in FIG. 1. The knobs 40 and 41 preferably include a pointer on them with indicia provided in a circle around the knobs to indicate settings corresponding to the width of the beam angle or angle of light emitted from the floodlight in accordance with the rotational setting or position of the knobs 40 and 41.

Reference now should be made to FIGS. 2 and 3, which are diagrammatic resprensentation of the operating lever mechanism attached to the knob 40 for tilting the sections 37 and 38 on the upper half of the floodlight housing shown in FIG. 1. It should be noted that the mechanism attached to the knob 41 for tilting the sections 34 and 35 constitutes a mirror image of the portion shown in FIG. 2 and 3, and operates in a manner identical to the operation of the portion shown in FIGS. 2 and 3.

As illustrated in FIG. 2, an interconnected linking lever mechanism is used to simultaneously tilt the panels 37 and 38 by differing amounts through the rotation of the knob 40. The linkage comprises a first pivot arm 46 which is attached to a pivot 47. This pivot 47 may be directly attached to the central axis of the knob 40 through the panel 22. The lever arm linkage is located for pivotal movement on the inside surface of the end 22 of the housing 20, shown in FIG. 1. The mechanism of FIG. 2 could be mounted on either end (21 or 22) of the housing and is attached through the pivot 47 to the knob 40 located on the outside of the end of the housing.

The lever arm 46 rocks about the pivot 47 in either direction to change the generally horizontal movement of a pair of linking levers 50 and 53. The lever 50 is pivotally attached at approximately the midpoint of the levers arm 46; and the arm 53 is pivotally attached at the upper end of the arm 46, as shown in FIG. 2. The right-hand end of the lever 50 then is attached to a pivot on a tab 51 secured to the rear surface of the reflector section 37 near its upper end.

The reflector section 37 is pivotally attached at each end to the end walls 21 and 22 at pivots 44, which are located on opposite ends near the center of the reflector section 37. Similarly, the right-hand end of the lever 53 is attached to a pivot on a connecting tab 54 which is attached to the rear of the reflector 38 near its upper end. The reflector section 38 is pivotally attached near its lower edge on a pivot 45 in both of the end walls 21 and 22.

With the lever arm 46 in its substantially vertical position, as shown in FIG. 2, the various reflector sections 33, 37, and 38, (and the corresponding sections in the lower half of the housing 33, 34, and 35) are placed in the orientation illustration to form a generally continuous parabolic cross-sectional reflecting surface. The dot-dash lines shown emanating from the lamp 31, and reflection off the different segments, indicate the spread of the beam of light emitted from the device. This is the narrowest beam.

When the knob 40 is rotated clockwise, as viewed in FIGS. 1, 2, and 3, the lever arm 46 moves in the direction of the arrow shown in FIG. 3 to rotate the upper ends of the reflector sections 37 and 38 in a clockwise direction about the piovots 44 and 45, as illustrated in FIG. 3. This widens the reflected pattern from the fixture by spreading the beam, as indicated.

It is apparent that, because of the location of the pivot points 44 and 45, and the different attachment points of the operating arms 50 and 53, the upper reflector panel 38 pivots a greater number of degrees for any given amount of rotation of the knob 40 then the intermediate panel 37. This provides a uniform spread of light from the floodlight over the range of beam widths which may be provided by approximately the differing parabolic reflectors which would be used for any fixed beam floodlight having a comparable beam width. While this approximation is not perfect, it is sufficiently close that a very uniform illumination area is porvided beneath the fixture for beams extending throughout the range of widths which may be obtained from the fixture.

In the example illustrated in FIGS. 1, 2, and 3, separate rotations of the knobs 40 and 41 are utilized to effect the rotation or tilting of the panels 34, 35, 37 and 38. These panels, however, may be rotated by means of a common operating knob; and such a modification is illustrated in the linkage of FIG. 4. In FIG. 4, the lever arm mechanisms illustrated in FIGS. 2 and 3 are essentially the same except the operating arm 46 has a short projection 56 extending beneath the pivot 47. This projection 56 is pivotally attached to a generally T-shaped actuating lever 60 which has an extension 62 located at its mid-point for attachment to an extension on a knob 65. The knob 65 is comparable to either one of the knobs 40 and 41, but is utilized as a single knob in place of the two knobs 40 and 41 FIG. 1.

When the knob 65 is rotated in a counterclockwise direction, the lever arm 62 is pulled to the left, as shown in FIG. 4, to pivot the arm 46 in a clockwise direction about the pivot 47. A similar linkage is provided for the pivoting levers attached to the reflector sections 34 and 35 on the lower portion of the housing. Since this is a duplicate of the upper portion shown in FIG. 4, it has not been illustrated. When the knob 65 is rotated in a clockwise direction, the projection 62 and the entire lever 60 moves to the right, as viewed in FIG. 4, to rock the operating arm 46 in a counterclockwise direction about the pivot 47. This then pulls the left-hand ends of the levers 50 and 53 toward the left, as viewed in FIG. 4, to effect the operation of the rotatable or tiltable reflector sections 37 and 38 in a manner comparable to that described above in conjunction with FIGS. 2 and 3.

FIGS. 5 and 6 illustrate an alternative to the embodiment of FIG. 4. In place of using a rotating knob 65 to move the levers 60 from left to right through the projection 62, a sliding adjustment knob 75 may be employed. An elongated slot 70 is formed in the side wall 22, as illustrated in the partially cut-away view of FIG. 5, and indicia 71 is provided to give an indication of the beam width being selected. A pointer 78 is provided for movement in the slot, and the knob 75 has a threaded shaft 76 which extends through the pointer 78 and the slot 70 where it is secured by means of a nut 72 to the linkage 62 of FIG. 4. When the knob 75 is moved back and forth in the slot 70, the operation of the linkage mechanism of FIG. 4 is effected in the same manner as described previously in conjunction with operation of that linkage by the knob 65.

FIG. 7 illustrates an alternative embodiment, which may be utilized in place of those shown in FIGS. 1 through 5, to effect the rotation of the sections 34, 35, 37, and 38. Once again, only the portion employed to rotate or tilt the reflector sections 37 and 38, is illustrated, since a mirror image operation takes place for the operation of the lower reflector sections 34 and 35. In the embodiment of FIG. 7, the linkages are shown as placed on the inside or light reflecting side of the reflector sections. The linkages again are located immediately adjacent the interior of the end wall 22 (or 21, if desired) and are interconnected with the reflector sections 37 and 38 in a manner comparable to the interconnections of the embodiments shown in detail in FIGS. 2 and 3. The orientation of the lever arms is somewhat different.

The actuating or operating arm 84 is pivotally attached to the sidewall 22 through a pivot 87. The arm 84 is a substantially horizontal position, in contrast to the substantially vertical position of the arm 46 of the embodiment of FIGS. 2 and 3. An intermediate connector lever 80 then extends from a point near the middle of the arm 87 to a pivoted connection on the upper edge of the reflector section 37, and a similar arm 83 is connected to the right-hand end of the arm 84. The arm 83 interconnects with the reflector 38 at a pivoted connection. The arms 80 and 83 correspond, from an operational standpoint, to the arms 50 and 53 of the embodiment shown in FIGS. 2 and 3. A similar set of linked lever arms are provided on the bottom of the device. This set includes an operating arm 94 connected to the end wall 22 through a pivot 97 and a pair of arms 91 and 93 which correspond to the arms 80 and 83 for connection to the reflectors 34 and 35. A spring is connected to bias both of the arms 84 and 94 about their pivots 87 and 97 toward one another to engage cam follower pins on each of these arms with the surface of a generally diamond-shaped cam 88. The cam 88 is mounted through a pivot 90 to a knob (not shown in FIG. 7), comparable to the knob 40 or 41 of FIG. 1. located on the outside of the end wall 22 of the housing 20. In the position shown in FIG. 7, the reflector sections 37 and 38 correspond to the position of FIG. 3. FIG. 8 illustrates the manner in which light form the lamp 31 is reflected from the various reflector sections 33, 37 and 38 with the cam 38 in the position shown in FIG. 7.

In FIG. 9, the cam 88 has been rotated 90° from the position shown in FIG. 7 to provide the minimum beam width adjustment which can be accomplished by the mechanism shown in FIGS. 7 and 9. The rotation of the cam 88 to the position shown in FIG. 9 narrows the beam width obtained from the floodlight, as illustrated in FIG. 10.

If desired, the cam operation mechanism shown in FIGS. 7 through 10 may be modified to provide separate cam operated adjustments comparable to the adjustments provided with the separate knobs 40 and 41 of the embodiments of FIGS. 1 through 3. Typically, however, a single control is employed to provide uniform, simultaneous adjustment of the different reflector sections to provide a uniform readily controllable adjustment of the beam width from the foodlight.

It also should be noted that in place of knobs of the type described above, the cam or the mechanism of FIGS. 1 through 3 also may be rotated using a screwdriver or a wrench. The adjustment knobs then would be replaced with an appropriate screw slot or nut for permitting this type of adjustment.

More than two pivoted reflector sections also may be used on each side of the lamp for flood lamps requiring a wide range of beam width adjustment. The same techniques, however, which are shown for the two sections on each side of the central section are utilized. For such multiple section devices, the length of the operating arms (such as 46 or 84) is extended to add additional coupling linking arms for each of the different reflector sections. The amount of movement which is obtained for each of the reflector sections is determined in accordance by the relative location of the attachment of the linking lever and the rotating pivot for such section.

It should be noted that the sections may be flat in place of sections of the parabolic curves which are illustrated in the various figures described above. Flat sections, however, do not provide the uniform intensity light distribution in the area of illumination beneath the fixture which is provided by utilization of parabolic cross-sections. The sections may be provided with a specular, diffused, or a textured (hammertone) finish in accordance with the intended application of the floodlight.

The foregoing preferred embodiments are to be considered as illustrative of the invention and not as limiting. Various changes and modifications may be made by those skilled in the art without departing from the scope of the invention as defined in the appended claims.

I claim:

1. A variable beam floodlight including in combination:
    a housing having first and second opposing ends, with a light exit opening having a predetermined length and a predetermined width located between said ends thereof;
    means for mounting a lamp in said housing to emit light through said light exit opening;
    a fixed reflector section located in the housing behind the lamp and extending substantially across the space between said first and second ends, said fixed reflector section having a width less than the width of said light exit opening for reflecting light outwardly through said opening;
    at least first and second pivoted reflector sections mounted in said housing to pivot between said first and second ends, thereof, with said first pivoted reflector section mounted near said fixed reflector section between said fixed reflector section and said second pivoted reflector section, both of said first and second pivoted reflector sections located on the same side of said fixed reflector section; and
    operating means coupled with said first and second pivoted reflector sections for simultaneously pivoting said first and second pivoted reflector sections through different degrees of rotation with respect to one another to vary the width of a beam of light emitted from said light exit opening in accordance with the pivoted orientation of said first and second pivoted reflector sections.

2. The combination according to claim 1 wherein all of said reflector sections are elongated sections extending from end to end of said first and second opposing ends of said housing and each having a substantially rectangular shape.

3. The combination according to claim 2 wherein cross-sections of said fixed reflector section and said first and second pivoted reflector sections in planes parallel to the planes of the ends of said housing comprises curved cross-sections.

4. The combination according to claim 3 wherein said curved cross-sections are concave sections facing said light exit opening.

5. The combination according to claim 4 wherein said operating means comprise ganged lever arm means.

6. The combination according to claim 5 wherein said lever arm means includes a common operating lever for simultaneously pivoting both of said first and second pivoted reflector sections.

7. The combination according to claim 6 wherein said operating means comprises an eccentric cam means attached to one of said first and second ends of said housing, and corresponding cam follower means on said common operating lever for movement about a pivot for effecting said simultaneous pivoting of said first and second pivoted reflector sections.

8. The combination according to claim 1 wherein said operating means comprise ganged lever arm means.

9. The combination according to claim 8 wherein said lever arm means includes a common operating lever for simultaneously pivoting both of said first and second pivoted reflector sections.

10. The combination according to claim 9 wherein said operating means comprises an eccentric cam means attached to one of said first and second ends of said housing, and corresponding cam follower means on said common operating lever for movement about a pivot point for effecting said simultaneously pivoting of said first and second pivoted reflector sections.

11. The combination according to claim 1 wherein cross-sections of said fixed reflector section and said first and second pivoted reflector sections in planes parallel to the planes of the ends of said housing comprise curved cross-sections.

12. The combination according to claim 11 wherein said curved cross-sections are concave sections facing said light exit opening.

13. The combination according to claim 1 further including third and fourth pivoted reflector sections mounted in said housing to pivot between said first and second ends of said housing, with said third pivoted reflector section mounted between the other side of said fixed reflector section and said fourth pivoted reflector section; and
    operating means coupled with said third and fourth pivoted reflector sections for simultaneously pivoting said third and fourth pivoted reflector sections through different degrees of rotation with respect to one another.

14. The combination according to claim 13 wherein said operating means comprises a common operating means for simultaneously pivoting said first, second, third and fourth reflector sections.

15. The combination according to claim 14 wherein said operating means comprises linked lever mechanisms for simultaneously pivoting said first, second, third and fourth reflector sections.

16. The combination according to claim 15 wherein said operating means includes a rotating member coupled with said linked lever mechanisms for providing said different degrees of pivoting of said first, second, third and fourth pivoted reflector sections in accordance with the direction and amount of rotation of said rotating member.

17. The combination according to claim 16 wherein said rotating member comprises eccentric cam means rotatably attached to one of said first and second ends of said housing, and corresponding cam follower means on said linked lever mechanisms for effecting said pivoting of said first, second, third and fourth reflector sections.

18. The combination according to claim 13 wherein all of said reflector sections are elongated sections extending from end to end of said first and second opposing ends of said housing and each having a substantially rectangular shape.

19. The combination according to claim 18 wherein cross-sections of said fixed reflector section and said pivoted reflector sections in planes parallel to the planes of the ends of said housing comprise curved-sections.

20. The combination according to claim 19 wherein said curved cross-sections are concave sections facing said light exit opening.

* * * * *